Sept. 16, 1924.  L. T. HUNTER  1,508,883
ADJUSTABLE THRUST BEARING
Filed Feb. 20. 1924
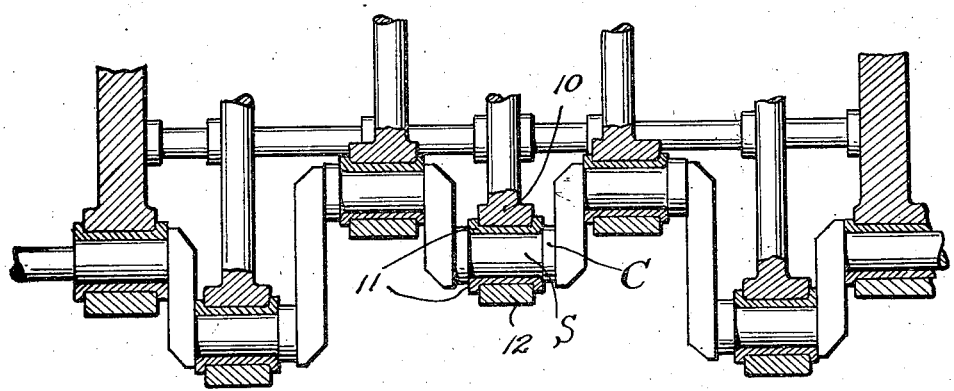
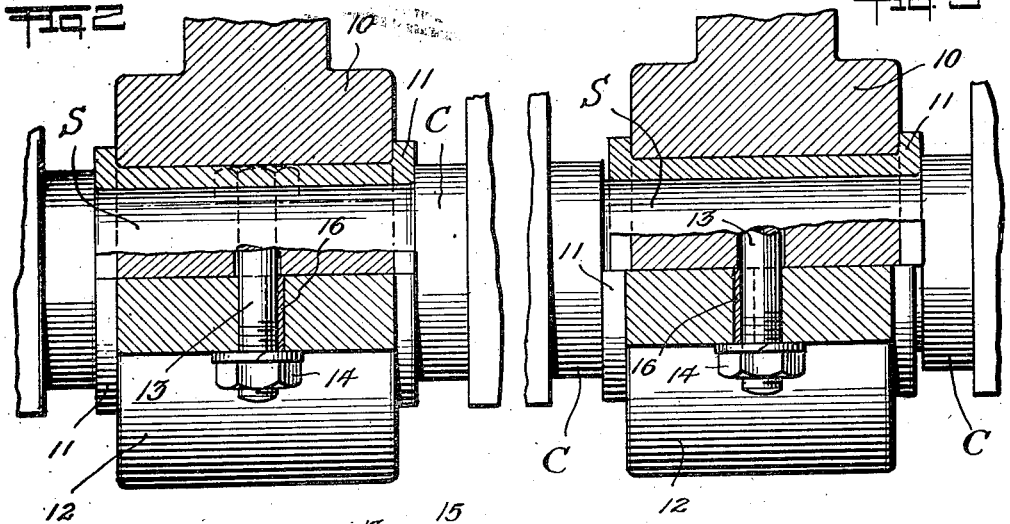
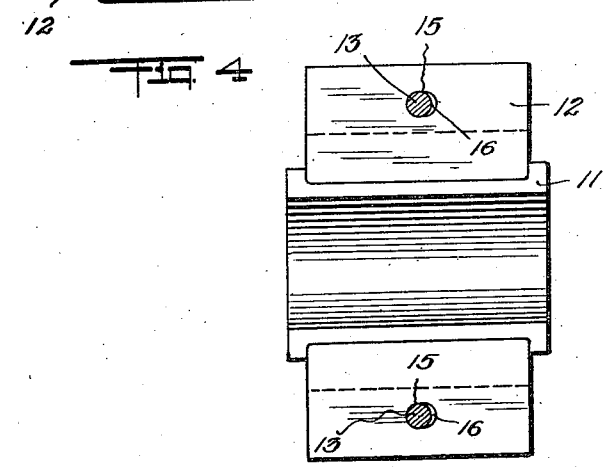
INVENTOR
*L. T. Hunter*
BY *Geo. S. Beeler*
ATTORNEY Patented Sept. 16, 1924.

1,508,883

UNITED STATES PATENT OFFICE.

LOUIS T. HUNTER, OF CHAPPAQUA, NEW YORK.

ADJUSTABLE THRUST BEARING.

Application filed February 20, 1924. Serial No. 693,981.

*To all whom it may concern:*

Be it known that I, LOUIS T. HUNTER, a citizen of the United States, residing at Chappaqua, in the county of Westchester and State of New York, have invented certain new and useful Improvements in Adjustable Thrust Bearings, of which the following is a specification.

This invention relates to power transmitting devices and has particular reference to the bearings supporting power shafting that may be subjected to end thrust, such for example as the central hanger bearing of the crank shaft of an internal combustion engine.

It is well known that the center hanger of the crank shaft is compelled to carry the maximum end thrust of the crank shaft resulting from the application or manipulation of the clutch, and consequently this bearing is required to be renewed very frequently. This operation is expensive because of the renewed parts required and also as to the time element and labor resulting from the fact of inconvenient accessibility. Among the objects of this invention, therefore, is to provide a bearing construction and means or method of adjustment that will obviate much of the expense and loss of time incident to the usual practice.

More specifically, this invention involves the provision of a bearing cap specially formed for the co-operation therewith of a take-up member through the use of which the same bearing may be used repeatedly or in changed positions so as to compensate for a large portion of the wear resulting from end thrust.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a diagram indicating the location of the bearing with which I am most particularly concerned, although it is to be understood that the same expedient may be used on other bearings or in other relations.

Fig. 2 is an enlarged side elevation of the same bearing, parts being in section and indicating the relative position of the parts when the bearing is new.

Fig. 3 is a view corresponding to Fig. 2, but showing the changed positions relatively of the parts after adjustment for wear.

Fig. 4 is a horizontal section through the center of the bearing with the clamping bolts in section and with the take-up members shown in the position of Fig. 2.

Fig. 5 is a detail perspective view of the spacing member.

Referring now more specifically to the drawings I show a bearing comprising an upper portion or hanger 10 fitted with a Babbitt metal lining 11, a lower bearing cap 12 also having a lining 11, and these bearing members are ordinarily clamped together by means of bolts 13 having removable nuts 14 so that the bearing members are in perfect vertical alignment or with their ends in the same vertical plane and against which ends the collars C of the shaft S bear when the bearing is new and unworn. In this condition as shown in Fig. 2 the thrust of the shaft in either direction ordinarily is sustained by both bearings. After a certain amount of wear or service, however, due to the end thrust of the shaft resulting from manipulation and use of the clutch so much wear takes place between the lining and the shaft collars that objectionable or dangerous amount of lost motion of the shaft endwise is permitted and this condition must be remedied. The usual practice is to reline the bearings or else put in entirely new bearings. Either expedient involves the dismantling of the hanger 10 and all parts associated with it.

To obviate this objectionable loss of time and expense I provide the lower bearing cap 12 with elliptical holes 15 through which the bolts project. The location of the bolt in this hole 15, with respect to the bearing cap as a whole is the same as in the usual arrangement of a circular hole fitting the bolt. That is to say, in assembling my new bearings both parts thereof occupy exactly the same relation to each other as in the old form of bearings, and at this time the bolts 13 lie in one end of the elliptical holes 15. To prevent endwise movement of the cap 12 having the elliptical holes at this time, I employ for each hole a take-up member in the nature of a crescent shaped filler member 16 made of metal such as steel and having an outside diameter corresponding to the diameter of the bolt. The inside diameter also corresponds to the diameter of the bolt so that the take-up member will fit directly against that side of the bolt adjacent to the space that is filled by the take-up member. Thus as shown in Figs. 2 and 4 the bearing when new and first assembled is essentially the same in operation as the ordinary bearing.

After such amount of wear on the ends of the bearing as will necessitate renewal or correction for the lost motion resulting, all I have to do to make the correction is to remove the nuts 14 and so allow the take-up members to drop down into the hand and then simply slide the cap 12 transversely of the bolts till the bolts are received in the opposite ends of the holes 15 and then slip the take-up members into place on the opposite side of the bolts as shown in Fig. 3 and then replace the nuts. The condition then is that the thrust in one direction will be taken by one bearing member and in the other direction by the other bearing member, but there will be no lost motion. So the bearing will possess about twice the wearing quality of an ordinary bearing and by this time renewal thereof may be demanded anyway because of other wearing conditions.

I claim:

1. In a thrust bearing, the combination of a relatively fixed bearing member, a cap co-operating with said member, clamping means including a bolt securing initially said cap and member in definite alignment transversely of the axis of the bearing, said cap being so formed as to provide endwise bodily adjustment of the cap as a unit with respect to the bearing member and bolt, and take-up means including a filler member extending in substantially parallel relation to said bolt and having direct bearing relation between said bolt and said bearing for varying the lateral adjustment of the bolt to the bearing so as to hold said bolt as adjusted, said bolt co-operating with said cap to hold the same from endwise movement when in fixed adjustment.

2. In mechanism of the nature set forth, the combination with a shaft having thrust collars, of bearing means for the shaft comprising a hanger member against which both collars are adapted to bear initially, a cap co-operating with the hanger member and likewise fitted initially between the collars in alignment with the hanger member, clamping means between the hanger member and cap including a bolt fixed in one of the members while the other member has an elliptical hole through which the bolt passes, and a take-up member fitted in and closing the otherwise unfilled end of the elliptical hole for holding the two bearing members in relatively fixed position both before and after adjustment.

In testimony whereof I affix my signature.

LOUIS T. HUNTER.